(12) United States Patent
Caponetti et al.

(10) Patent No.: US 10,364,797 B2
(45) Date of Patent: Jul. 30, 2019

(54) PARTIAL AND FULL LOAD CONTROLLERS OF A WIND TURBINE

(71) Applicant: VESTAS WIND SYSTEMS A/S, Aarhus N (DK)

(72) Inventors: Fabio Caponetti, Aarhus C (DK); Jesper Sandberg Thomsen, Hadsten (DK); Jacob Deleuran Grunnet, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 154 days.

(21) Appl. No.: 15/547,199

(22) PCT Filed: Jan. 27, 2016

(86) PCT No.: PCT/DK2016/050020
§ 371 (c)(1),
(2) Date: Jul. 28, 2017

(87) PCT Pub. No.: WO2016/119791
PCT Pub. Date: Aug. 4, 2016

(65) Prior Publication Data
US 2018/0010577 A1    Jan. 11, 2018

(30) Foreign Application Priority Data
Jan. 29, 2015    (DK) .................................. 2015 70050

(51) Int. Cl.
*F03D 7/02* (2006.01)
*F03D 7/04* (2006.01)
*F03D 9/25* (2016.01)

(52) U.S. Cl.
CPC ........... *F03D 7/028* (2013.01); *F03D 7/0224* (2013.01); *F03D 7/0272* (2013.01);
(Continued)

(58) Field of Classification Search
USPC ................... 290/44, 55; 244/170–179; 416/1
See application file for complete search history.

(56) References Cited

U.S. PATENT DOCUMENTS 2,998,210 A * 8/1961 Carter, Jr. ............ G05D 1/0858
244/17.13
3,071,335 A * 1/1963 Carter, Jr. ............ G05D 1/0858
244/17.13
(Continued)

FOREIGN PATENT DOCUMENTS

CN           1982699 A      6/2007
CN         101660489 A      3/2010
(Continued)

OTHER PUBLICATIONS

International Search Report for PCT/DK2016/050020, dated Apr. 18, 2016.
Danish Search Report for PA 2015 70050, dated Aug. 28, 2015.

*Primary Examiner* — Pedro J Cuevas
(74) *Attorney, Agent, or Firm* — Patterson + Sheridan, LLP (57) ABSTRACT

The invention relates to a method for controlling a wind turbine in partial and full load. In order to avoid disadvantages of switching between partial and full load controllers, the wind turbine control system is configured so that both the partial and full load controller provides control action during partial and full load. For that purpose, the partial and full load controllers are configured with variable gains, wherein gain scheduling is performed so that the gain of partial load controller is larger than the gain of the full load controller during partial load and vice verso so that the gain of the full load controller is larger than the gain of the partial load controller during full load.

11 Claims, 7 Drawing Sheets

(52) U.S. Cl.
CPC ........... *F03D 7/0276* (2013.01); *F03D 7/046* (2013.01); *F03D 9/25* (2016.05); *F05B 2270/101* (2013.01); *F05B 2270/1032* (2013.01); *F05B 2270/1033* (2013.01); *F05B 2270/20* (2013.01); *F05B 2270/327* (2013.01); *Y02E 10/723* (2013.01)

(56) References Cited

U.S. PATENT DOCUMENTS

| | | | | |
|---|---|---|---|---|
| 3,483,463 | A * | 12/1969 | Smith | H02P 9/42 318/768 |
| 4,161,658 | A * | 7/1979 | Patrick | F03D 7/0224 290/44 |
| 5,155,375 | A * | 10/1992 | Holley | F03D 7/0224 290/44 |
| 5,289,041 | A * | 2/1994 | Holley | F03D 7/0224 290/44 |
| 7,211,989 | B2 * | 5/2007 | Drubel | F02C 7/268 322/29 |
| 7,281,891 | B2 * | 10/2007 | Smith | F03D 7/0224 415/4.3 |
| 7,321,221 | B2 * | 1/2008 | Bucker | H02P 9/007 322/25 |
| 7,342,323 | B2 * | 3/2008 | Avagliano | F03D 7/0224 290/55 |
| 7,471,007 | B2 * | 12/2008 | Bucker | H02P 9/007 290/44 |
| 7,489,047 | B2 * | 2/2009 | Shiota | F03D 9/11 290/44 |
| 7,576,443 | B2 * | 8/2009 | Raju | B63J 3/00 290/40 F |
| 8,025,476 | B2 * | 9/2011 | Zheng | F03D 7/0224 415/1 |
| 8,085,004 | B2 * | 12/2011 | Xu | H02K 19/26 290/31 |
| 8,622,698 | B2 * | 1/2014 | Kristoffersen | F03D 7/0224 290/44 |
| 8,704,393 | B2 * | 4/2014 | Perley | F03D 7/0272 290/44 |
| 8,858,174 | B2 * | 10/2014 | Lee | F03D 7/0224 416/1 |
| 8,957,537 | B2 * | 2/2015 | Guadayol Roig | F03D 7/022 290/44 |
| 9,341,159 | B2 * | 5/2016 | Koerber | F03D 7/0224 |
| 9,605,558 | B2 * | 3/2017 | Perley | F03D 7/0288 |
| 9,611,834 | B2 * | 4/2017 | Esbensen | F03D 7/0224 |
| 9,762,160 | B2 * | 9/2017 | Tesch | H02P 9/007 |
| 9,896,959 | B2 * | 2/2018 | Bertolotti | F03D 17/00 |
| 2006/0066111 | A1 * | 3/2006 | Suryanarayanan | F03D 7/0272 290/44 |
| 2007/0075546 | A1 * | 4/2007 | Avagliano | F03D 7/0224 290/44 |
| 2007/0205602 | A1 | 9/2007 | Willey et al. | |
| 2008/0136188 | A1 | 6/2008 | Krueger | |
| 2009/0047116 | A1 * | 2/2009 | Barbu | F03D 7/0224 415/1 |
| 2011/0305568 | A1 * | 12/2011 | Brath | F03D 7/0224 416/1 |
| 2012/0292903 | A1 * | 11/2012 | Merkel | F03D 7/0272 290/44 |
| 2013/0106107 | A1 * | 5/2013 | Spruce | F03D 7/0224 290/44 |
| 2015/0377215 | A1 * | 12/2015 | Agarwal | F03D 7/044 416/1 |
| 2017/0241405 | A1 * | 8/2017 | Kruger | F03D 7/028 |
| 2018/0135601 | A1 * | 5/2018 | Caponetti | F03D 17/00 |
| 2018/0156196 | A1 * | 6/2018 | KJ R | F03D 7/0224 |
| 2018/0156200 | A1 * | 6/2018 | Caponetti | G01K 13/00 |
| 2018/0171983 | A1 * | 6/2018 | Caponetti | G01K 13/00 |
| 2018/0180029 | A1 * | 6/2018 | Caponetti | F03D 17/00 |
| 2018/0180030 | A1 * | 6/2018 | Thogersen | F03D 1/06 |

FOREIGN PATENT DOCUMENTS

| | | |
|---|---|---|
| CN | 102996335 A | 3/2013 |
| EP | 2767709 A1 | 8/2014 |
| WO | 20140121800 A1 | 8/2014 |

* cited by examiner

PARTIAL AND FULL LOAD CONTROLLERS OF A WIND TURBINE

FIELD OF THE INVENTION

The invention relates to control of wind turbines, particularly to partial and full load controllers of a wind turbine.

BACKGROUND OF THE INVENTION

Wind turbine generators may comprise partial and full load controllers for determining pitch and power references for the pitch actuators and the power generator, respectively. The objective for the partial load controller, which is selected for wind speed below a rated wind speed, is to optimise power production from a given available amount of wind energy. The objective for the full load controller, which is selected for wind speed above the rated wind speed, is to produce the nominal power of the wind turbine generator.

Switching between the partial and full load controllers is required as the wind velocity changes between wind velocities below and above the rated wind speed. Such switching may have undesirable effects on structural loads, utilisation of the wind energy and other operating conditions of the wind turbine generator.

Thus, it is a problem that known control schemes of wind turbines may have difficulties in dealing with switching between different control schemes.

SUMMARY OF THE INVENTION

It is an object of the invention to improve the control of a wind turbine during partial and full load, particularly to avoid disadvantages associated with switching between partial and full load controllers dependent on wind speed.

It is a further object of the invention to reduce structural loads and oscillations of wind turbine components due to switching between partial and full load controllers.

In a first aspect of the invention there is provided a method for controlling a wind turbine, wherein the wind turbine comprises a rotor with at least one blade having a pitch angle which is controllable dependent on a pitch request, and a power generator connected to the rotor, the power generator having a power production which is controllable dependent on a generator request, wherein a generator speed of the generator is controllable via the pitch request and the generator request, the method comprises controlling the generator speed by determining the generator request dependent on a first generator speed error determined dependent on a generator speed reference, the generator speed and a first speed modification, wherein the generator request is determined by minimizing the first generator speed error, wherein the first speed modification is determined so that the generator speed approaches the generator speed reference for wind speeds below a rated wind speed, wherein the first speed modification is determined so that the generator request approaches a maximum generator request for wind speeds above the rated wind speed, wherein the maximum generator request is a partial load controller saturation limit, and wherein the first speed error is amplified by a variable first gain, controlling the generator speed by determining the pitch request dependent on a second generator speed error determined dependent on the generator speed reference, the generator speed and a second speed modification, wherein the pitch request is determined by minimizing the second generator speed error, wherein the second speed modification is determined so that the generator speed approaches the generator speed reference for wind speeds above the rated wind speed, wherein the second speed modification is determined so that the pitch request approaches a minimum pitch request for wind speeds below the rated wind speed, wherein the minimum pitch request is a full load controller saturation limit, and wherein the second speed error is amplified by a variable second gain, determining the variable first and second gains so that the first gain is greater than the second gain at least for some for wind speeds below the rated wind speed, so that the first gain is smaller than the second gain at least for some wind speeds above rated wind speed, and so that the first gain is equal to the second gain at least for a single wind speed in the proximity of the rated wind speed.

Advantageously by controlling the generator speed by determining both the generator request, the pitch request and gains for the first and second speed errors it becomes possible to continuously control the generator speed by updating both the generator request and the pitch request for wind speed above and below the rated wind speed. Since both the generator request and the pitch request are adapted dependent on the variable gains and the adjusted first and second errors, it is not necessary to switch between determining the generator request for wind speed below rated wind speed and the pitch request for wind speed above the rated wind speed.

The determination of the first speed modification performed so that the generator speed approaches the generator speed reference for wind speeds below a rated wind speed may be performed by setting or determining the first speed modification to a small value, e.g. zero or close to zero.

The determination of the first speed modification performed so that the generator request approaches the maximum generator request, i.e. the saturation limit of the partial load controller, may be performed by modifying the first generator speed error, i.e. reducing or increasing the first generator speed error into non-zero values, for wind speeds above the rated wind speed. The modification of the speed error may be performed by modifying the first generator speed reference by the first speed modification value, e.g. by adding the modified first speed modification value to the first generator speed reference.

The partial load controller saturation limit is a limit which limits the output from the partial load controller which determines the generator request.

The determination of the second speed modification performed so that the generator speed approaches the generator speed reference for wind speeds above rated wind speed may be performed by setting or determining the first speed modification to a small value, e.g. zero or close to zero.

The determination of the second speed modification performed so that the pitch request approaches the minimum pitch request, i.e. a saturation limit of the full load controller, may be performed by modifying the second generator speed error, i.e. reducing or increasing the error speed into non-zero values, for wind speeds above the rated wind speed. The modification of the speed error may be performed by modifying the second generator speed reference by the second speed modification value, e.g. by adding the modified second speed modification value to the second generator speed reference.

The full load controller saturation limit is a limit which limits the output from the full load controller which determines the pitch request.

According to an embodiment the method comprises controlling the generator speed by determining the generator request, the pitch request and the first and second gains for wind speeds below, above and at the rated wind speed. The method may further comprise determining the first and second speed modifications.

According to an embodiment, the first and second gains are determined so that the sum of the first and second gains are substantially constant over a range of wind speeds comprising the rated wind speed. For example, the first and second gains are determined so that the sum of the first and second gains are substantially constant over a range of wind speeds extending from a cut-in wind speed to a cut-out wind speed, wherein the range comprises the rated wind speed. Advantageously, by constraining the determination of the of the first and second gains by the criteria that the sum of the gains should be constant it may be ensured that the combined control action from the partial and full load controllers is constant. At relative large and low wind speeds, e.g. in complete full or partial load, the sum of the gains may be allowed to be larger than near the rated wind speed without causing controller instability.

According to an embodiment the first gain and/or the second gain are determined dependent on a difference between an actual pitch and the pitch reference. Since the actual pitch is normally close to the pitch reference during partial load this can be utilised for determining the gains, e.g. by setting the first gain to a relatively large value (larger than the value of the second gain) when the pitch difference is small, or by determining the gains as a function of the pitch difference.

According to an embodiment the first gain and/or the second gain are determined dependent on a difference between an actual power and the power reference. Since the actual power is normally close to the power reference during full load this can be utilised for determining the gains, e.g. setting the second gain to a relatively large value (larger than the value of the first gain) when the power difference is small, or by determining the gains as a function of the power difference.

According to an embodiment the first speed modification is determined dependent on a difference between an actual pitch and the pitch reference. By determining the first speed modification in this way the first speed modification is gradually increased (or decreased) as the pitch difference increases, i.e. when the wind turbine enters full load operation.

According to an embodiment the second speed modification is determined dependent on a difference between an actual power and the power reference. Accordingly, the second speed modification is gradually increased (or decreased) As the power difference increases, i.e. when the wind turbine enters partial load operation.

According to an embodiment, the first generator speed error is determined dependent on a first modified generator speed reference and the generator speed, wherein the first modified generator speed reference is determined by addition of the first speed modification to the generator speed reference.

According to an embodiment the second generator speed error is determined dependent on a second modified generator speed reference and the generator speed, wherein the second modified generator speed reference is determined by addition of the second speed modification to the generator speed reference.

A second aspect of the invention relates to a control system for controlling a wind turbine, wherein the wind turbine comprises a rotor with at least one blade having a pitch which is controllable dependent on a pitch reference, and a power generator connected to the rotor, the power generator having a power production which is controllable dependent on a generator reference, wherein a generator speed of the rotor is controllable via the pitch reference and the generator reference, the control system comprises,

- partial load speed error calculation unit configured for determining a first generator speed error dependent on a generator speed reference, the generator speed and a first speed modification,
- a full load speed error calculation unit configured for determining a second generator speed error dependent on the generator speed reference, the generator speed and a second speed modification,
- a first speed modification calculation unit configured for determining the first speed modification so that the generator speed approaches the generator speed reference for wind speeds below a rated wind speed, and so that the generator request approaches a maximum generator request for wind speeds above the rated wind speed, wherein the maximum generator request is a partial load controller saturation limit,
- a second speed modification calculation unit configured for determining the second speed modification so that the generator speed approaches the generator speed reference for wind speeds above the rated wind speed, and so that the pitch request approaches a minimum pitch request for wind speeds below the rated wind speed, wherein the minimum pitch request is a full load controller saturation limit,
- a partial load controller configured for controlling the generator speed by determining the generator request dependent on the first generator speed error by minimizing the first generator speed error, wherein the partial load controller is configured for amplifying the first speed error by a variable first gain,
- a full load controller configured for controlling the generator speed by determining the pitch request dependent on the second generator speed error by minimizing the second generator speed error, wherein the full load controller is configured for amplifying the second speed error by a variable second gain, and
- a gain scheduler configured for determining the variable first and second gains so that the first gain is greater than the second gain at least for some for wind speeds below the rated wind speed, so that the first gain is smaller than the second gain at least for some wind speeds above rated wind speed, and so that the first gain is equal to the second gain at least for a single wind speed in the proximity of the rated wind speed.

A third aspect of the invention relates to a wind turbine comprising the control system according to the second aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
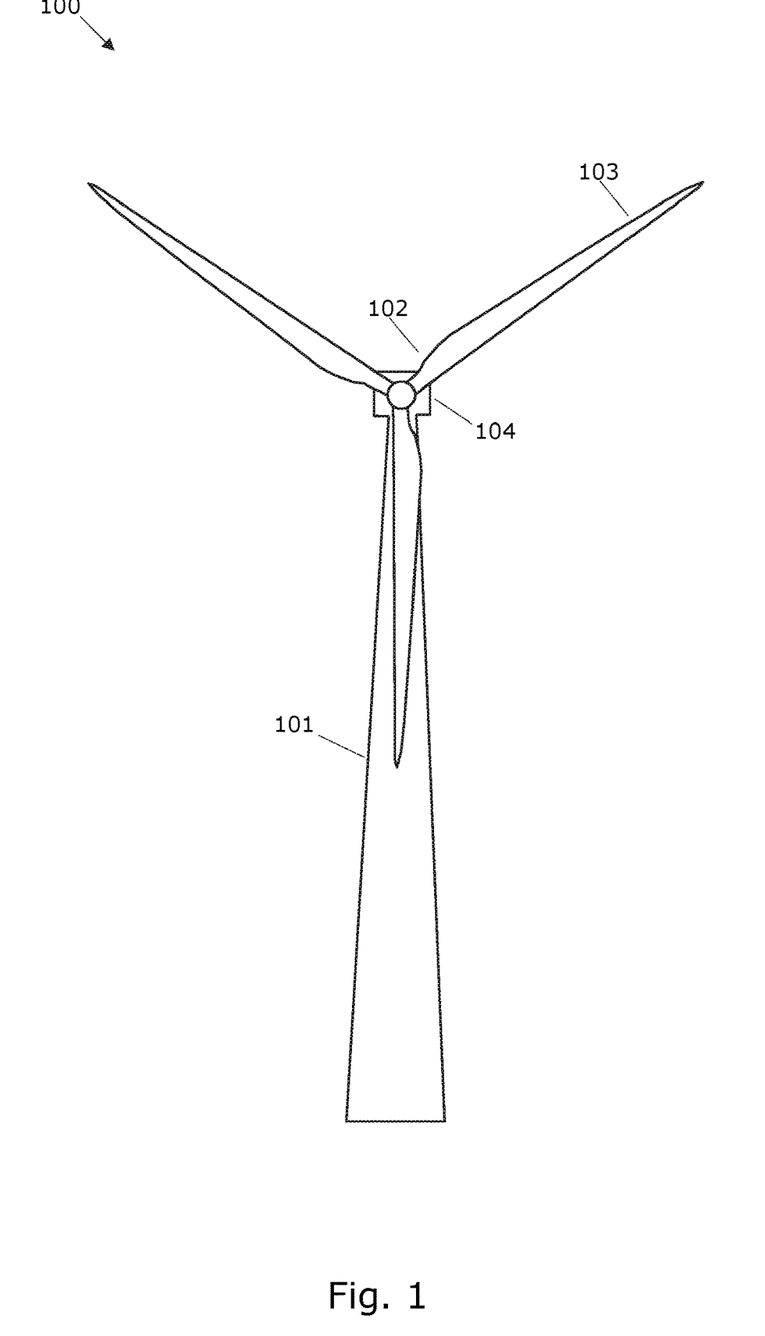
FIG. 1 illustrates a wind turbine.

FIG. 1 shows a wind turbine 100 comprising a tower 101 and a rotor 102 with at least one rotor blade 103. Here three blades are illustrated however the number of blades may vary. The rotor is connected to a nacelle 104 which is mounted on top of the tower 101. The rotor is adapted to drive a power generator situated inside the nacelle. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The wind turbine 100 may also be referred to with the common abbreviation WTG (Wind Turbine Generator).

The pitch angle of the blades 103 is controllable dependent on a pitch request. The aero-dynamic efficiency of the rotor, and thereby, the generator speed and power production can be adjusted by changing the pitch angle.

The power production of the power generator is also controllable dependent on a generator request to the power generator. The generator request may be in the form of a power request or a torque request which sets the desired amount of power to be produced by the generator.

Accordingly, the generator speed of the generator and thereby the power production, can be adjusted by adjusting the pitch request, the generator request or both.

Figure 2:
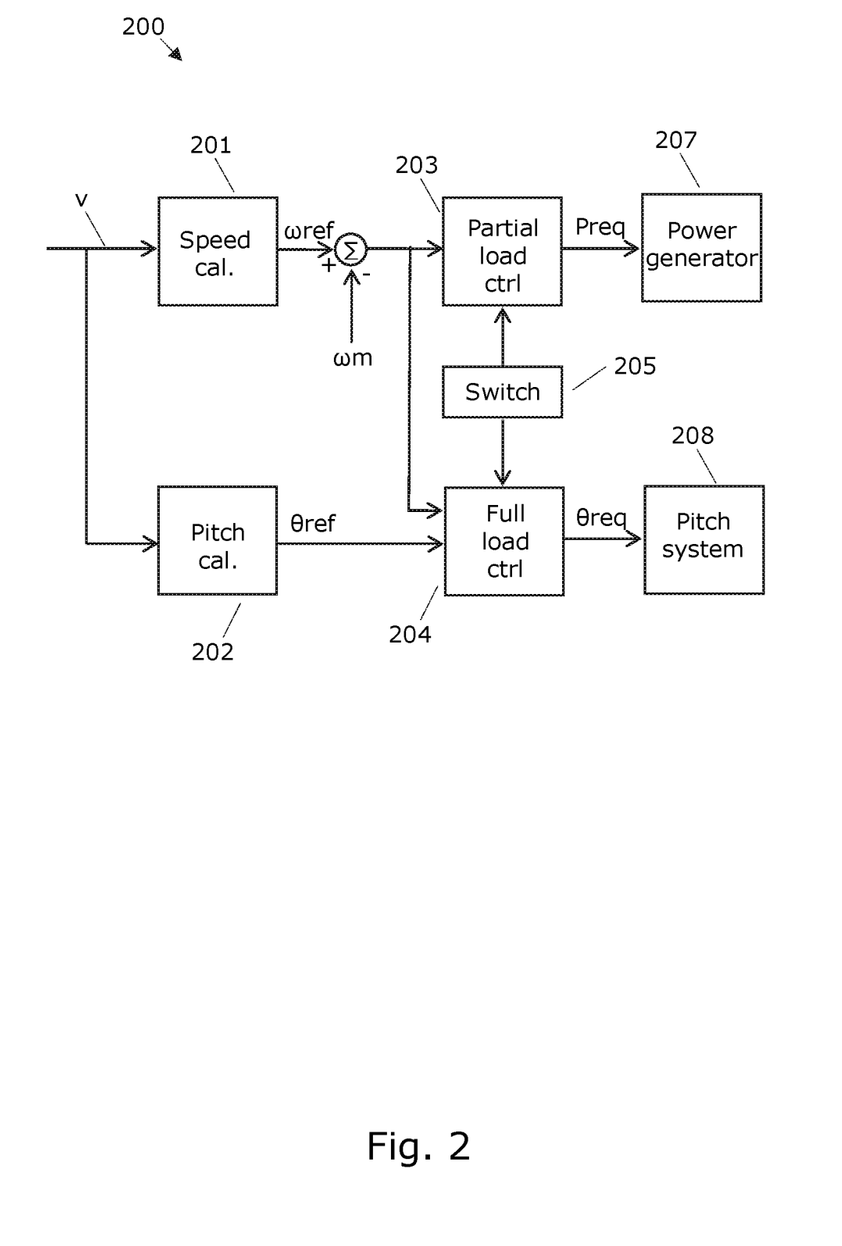
FIG. 2 shows a control system for a wind turbine.

FIG. 2 shows a control system 200 for a wind turbine 100. The control system is configured with a partial load controller 203 which determines the generator request Preq and a full load controller 204 which determines the pitch request θreq dependent on a difference between a generator speed reference ωref, e.g. the optimum generator speed ωopt or the rated generator speed ωrated, and a measured generator speed ωm. The full load controller 204 may additionally receive a pitch reference θref.

The generator request Preq is supplied to the power generator 207. The power generator may contain a generator controller which receives the generator request Preq and controls the generator to produce the requested power Preq. Accordingly, the power generator may be defined as a power generator system containing the generator controller, the generator and other units and configured to produce power according to the requested amount.

The pitch request θreq is supplied to the pitch system 208 which performs pitch adjustment of the blades 103. The pitch system may contain a pitch controller with receives the pitch request θreq and controls the pitch actuators to set the pitch to the requested pitch.

The partial load state is characterised in that the wind speed v is not high enough to enable generation of the nominal or rated electrical power from the generator. In this state the pitch θ and the rotor speed are controlled to optimize aerodynamic efficiency of the wind turbine 100. The rotor speed and the generator speed ωr are linked by the gear ratio of the gear connecting the rotor with the generator shaft. In practice the pitch θ only varies little in the partial load state as a function of wind speed and may be set to the optimum pitch θopt which maximises the aero-dynamic efficiency of the rotor. The generator speed ωr may be controlled to extract as much power as possible by tracking the desired generator speed ωref. In the partial load state the generator speed ωr is controlled via the generator request Preq which affects generator torque.

Accordingly, in partial load, the partial load controller 203 calculates the generator request Preq (i.e. a power or torque set point for the power generator 207) that that minimises the difference between the generator speed reference ωref and the measured generator speed ωm.

The full load state is characterised in that the wind speed v is high enough to enable generation of the nominal or rated electrical power. Therefore, the generator speed and generator power may be controlled to achieve a power production close to the nominal power. This is achieved by setting the generator reference ωref to the rated generator speed ωrated. In the full load state the rotor speed ωr is controlled via the pitch θ so as to achieve a controlled, e.g. substantially constant, extraction of wind energy by the blades.

Accordingly, in full load, the full load controller 204 calculates the pitch request θreq that minimises the difference between generator speed reference ωref (here the ωrated or a de-rated generator speed) and the measured generator speed ωm.

During partial load, the full load controller may be configured to set the pitch request θreq to the pitch reference θref, e.g. the optimum pitch θopt. During full load the input θref to the full load controller 204 may be ignored.

The desired generator speed ωref may be determined by a speed calculator 201 dependent on the estimated or measured wind speed energy content of the wind v and predetermined aerodynamic characteristics of the blades. The desired pitch θref, may be determined by a pitch calculator 202 dependent on the estimated or measured wind speed energy content of the wind v, other predetermined aerodynamic characteristics of the blades and possibly the rotor speed ωr.

A shift between the partial load control and full load control may be invoked when the desired amount of electrical energy production is greater or smaller than the energy content of the wind. As an example, since the wind energy is dependent on the wind velocity, a shift between the partial load control and full load control may be invoked when the wind velocity v, passes a given threshold, e.g. given by the rated wind speed, vrated. The switch 205 determines which of the partial load controller 203 or the full load controller 204 should be active, e.g. by comparing the desired amount energy production with the energy content of the wind.

The switching between the partial and full load controllers may cause undesirable or non-smooth changes in different operating parameters of the WTG. For example, a switching between partial and full load states may cause over-speed of the rotor, undesirable tower loads, undesirable blade loads and high pitch system requirements due to high pitch speed.

Figure 3:
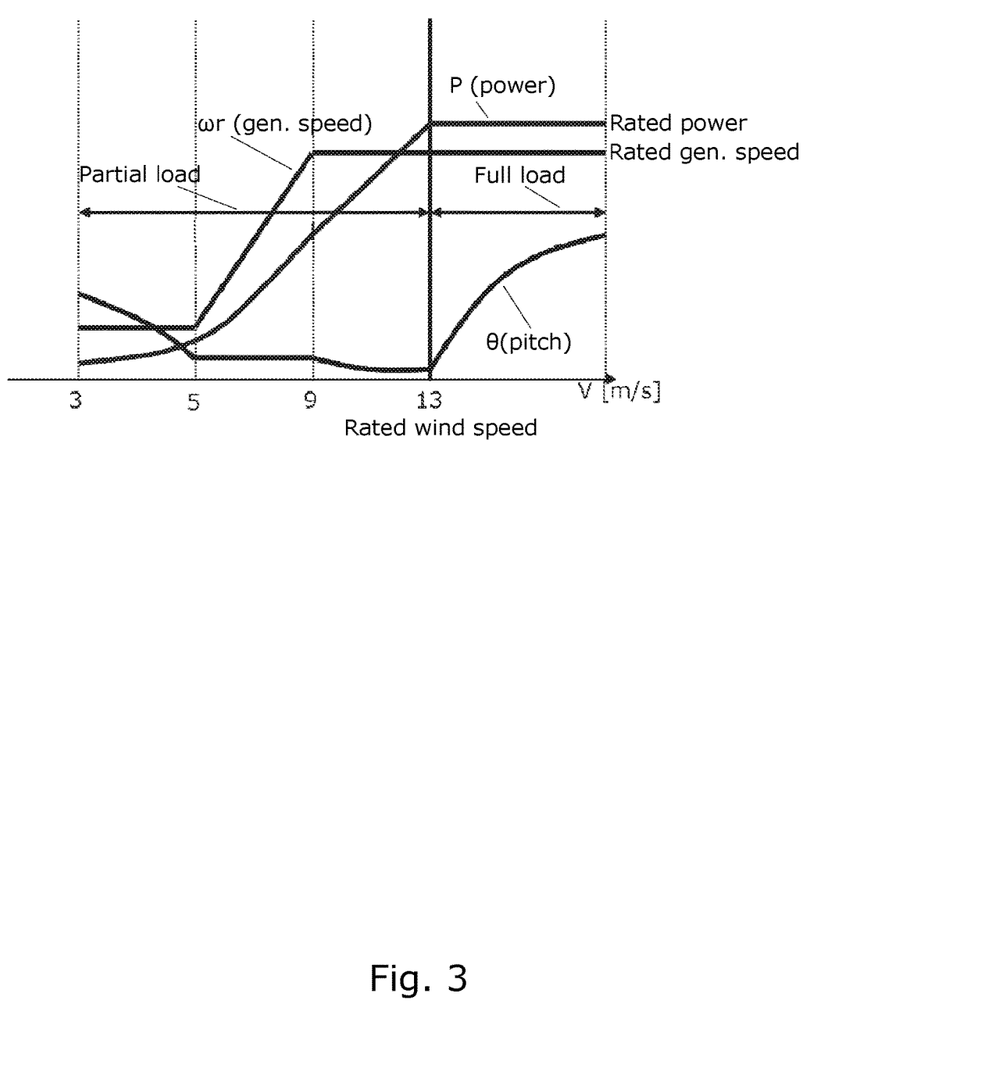
FIG. 3 shows variations of pitch, generator speed and produced power in partial and full load regions.

FIG. 3 shows regions of partial and full load as well as variations of pitch (θ), generator speed (ωr) and produced power (P) as a function of wind speed v.

In the example shown in FIG. 3, the partial load occurs from cut-in wind speed (here 5 m/s but could be different)

and until rated wind speed (here 13 m/s). In this region the turbine produces as much power as is possible with the available wind.

Full load occurs from rated wind speed and until cut-out wind speed. In this region the turbine produces rated power (e.g. 3 MW).

The generator speed may be ramped up from cut-in wind speed until maximum is reached at some wind speed (here at 9 m/s).

In partial load the optimum pitch θopt is almost constant for wind speed above 5 m/s and up to rated wind speed. The pitch request θref may be set to follow the optimum pitch during partial load.

Figure 4:
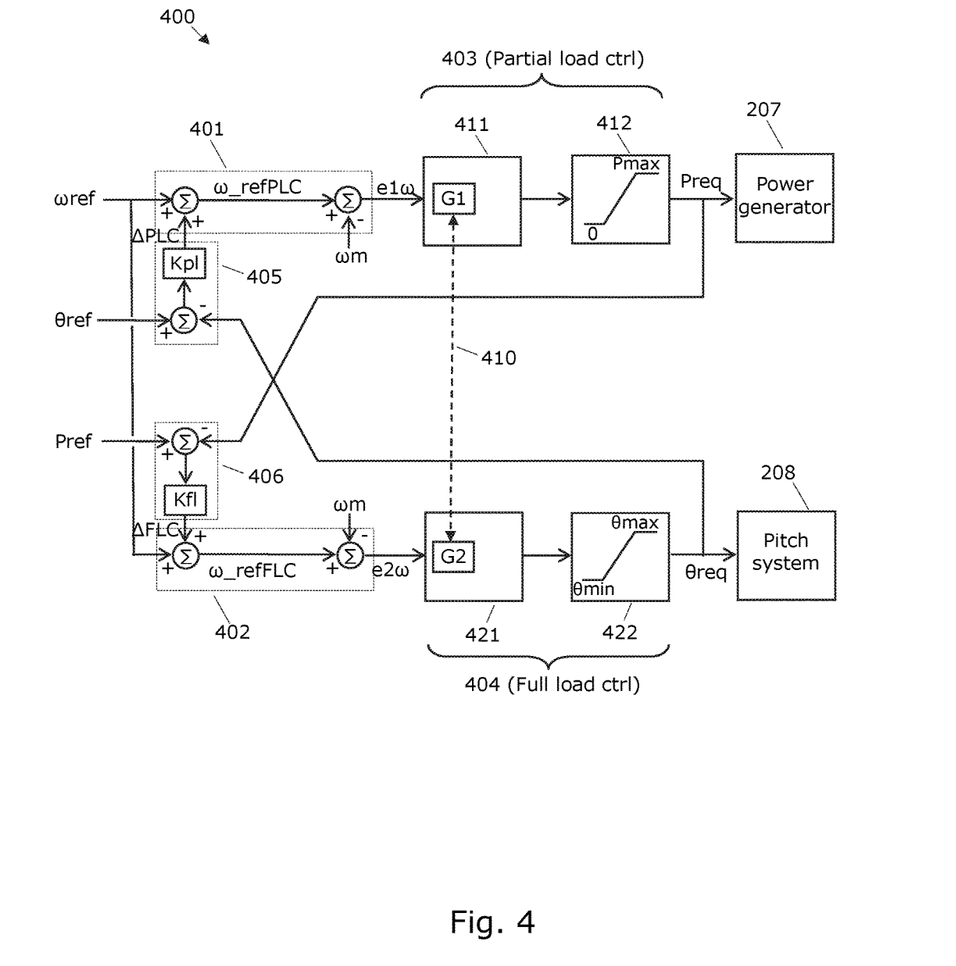
FIG. 4 shows an alternative control system for a wind turbine.

FIG. 4 shows a control system 400 for a wind turbine. The control system 400 comprises a partial load controller 403 and a full load controller 404 configured to determine the generator request Preq and the pitch request θreq for controlling the generator speed ωr during partial and full load modes. Contrary to the control system 200, the control system 400 is configured so that the partial and full load controllers 403, 404 are operated continuously in both partial and full load without any switching between the controllers as the wind velocity increases or decreases beyond the rated wind speed.

The control system 400 comprises a partial load speed error calculation unit 401 configured to determine a first generator speed error e1ω dependent on a the desired generator speed reference ωref (e.g. the optimum generator speed ωopt), the generator speed ωm and a first speed modification ΔPLC. The first generator speed error e1ω is supplied to the partial load controller 403 configured to determine the generator request Preq by minimizing the first generator speed error e1ω. The function for minimizing the speed error may be embodied by a PI controller, or other controller types, comprised by a first controller component 411 of the partial load controller 403.

The generator speed ωm is the actual or measured generator speed.

The partial load controller 403 further comprises a first amplitude limiter 412 configured to limit the maximum output from the first controller component 411 to a maximum generator request Pmax, e.g. to a maximum rated generator power Prated or a maximum derated power Pderated, and to limit the minimum output from the first controller component 411 to zero. The limits of the limiter 412 are also referred to as saturation limits. Accordingly, the maximum generator request is a partial load controller saturation limit.

The first speed modification ΔPLC is determined so that the generator speed ωm approaches the generator speed reference ωref for wind speeds below a rated wind speed, and so that the generator speed reference ωref (and thereby the first generator speed error e1ω) is reduced for wind speeds above the rated wind speed. When first generator speed error e1ω is reduced, the controller component will increase the outputted generator request Preq in an attempt to lower the measured generator speed ωm so as to increase the error e1ω (e.g. back to zero). Since the output from the first controller component 411 is limited to a maximum generator reference Pmax by the first amplitude limiter 412, the determined generator request Preq will approach the maximum generator reference Pmax for wind speeds above the rated wind speed.

The control system 400 further comprises a full load speed error calculation unit 402 configured to determine a second generator speed error e2ω determined on the generator speed reference ωref, the generator speed ωm and a second speed modification ΔFLC. The second generator speed error e2ω is supplied to the full load controller 404 configured to determine the pitch request θreq by minimizing the second generator speed error e2ω. Similarly to the partial load controller 403, the function for minimizing the speed error may be embodied by a PI controller comprised by a second controller component 421 of the full load controller 404.

The full load controller 404 further comprises a second amplitude limiter 422 configured to limit the maximum output from the second controller component 421 to a maximum pitch request θmax, and to limit the minimum output from the second controller component 421 to a minimum pitch request θmin, e.g. the optimum pitch request θopt. The lower limit θmin may be a fixed value, or the lower limit θmin may be adjusted continuously or regularly to equal the desired pitch θref, e.g. as determined by the pitch calculator 202. The limits of the limiter 422 are also referred to as saturation limits. Accordingly, the minimum pitch request θmin is referred to as a full load controller saturation limit.

The second speed modification ΔFLC is determined so that the generator speed ωm approaches the generator speed reference ωref for wind speeds above the rated wind speed, and so that generator speed reference ωref and, thereby, the second generator speed error e2ω is increased for wind speeds below the rated wind speed. When the second generator speed error e2ω is increased, the second controller component 421 will decrease the outputted pitch request (θreq) in an attempt to increase the measured generator speed ωm so as to decrease the second error e2ω (e.g. back to zero). Since the output from the second controller component 421 is limited to a minimum pitch request θmin by the second amplitude limiter 422, the determined pitch request θreq will approach the minimum pitch θmin for wind speeds below the rated wind speed vrated.

The partial load controller 403 is configured to amplify the first speed error e1ω by a variable first gain G1. The variable gain G1 may be the proportional gain in a PI controller comprised by the first controller component 411. Similarly, the full load controller 404 is configured to amplify the first speed error e2ω by a variable second gain G2. The gain G2 may similarly be the proportional gain in a PI controller comprised by the second controller component 421.

The control system 400, e.g. a gain scheduler 410, is configured to determine the variable first and second gains G1, G2 so that the first gain G1 is greater than the second gain G2 at least for some for wind speeds below the rated wind speed, so that the first gain G1 is smaller than the second gain G2 at least for some wind speeds above rated wind speed, and so that the first gain G1 is equal to the second gain G2 at least for a single wind speed in the proximity of the rated wind speed.

As illustrated, the partial load speed error calculation unit 401 may be configured to determine the first generator speed error e1ω dependent on a first modified generator speed reference ω_refPLC and the generator speed ωm, e.g. by subtracting ωm from ω_refPLC. The first modified generator speed reference may be determined by addition (or subtracting depending on the sign of ΔPLC) of the first speed modification ΔPLC to the generator speed reference ωref. Clearly, the speed error e1ω could equivalently be determined by adding (or subtracting) ΔPLC from ωm and subtracting this signal from ωref.

Similarly, the full load speed error calculation unit 401 may be configured to determine the second generator speed error e2ω dependent on a second modified generator speed reference ω_refFLC and the generator speed ωm, where the second modified generator speed reference may be determined by addition of the second speed modification ΔFLC to the generator speed reference ωref. The alternatives mentions for determining the first generator speed error e1ω applies equivalently to the determination of e2ω.

Figure 5:
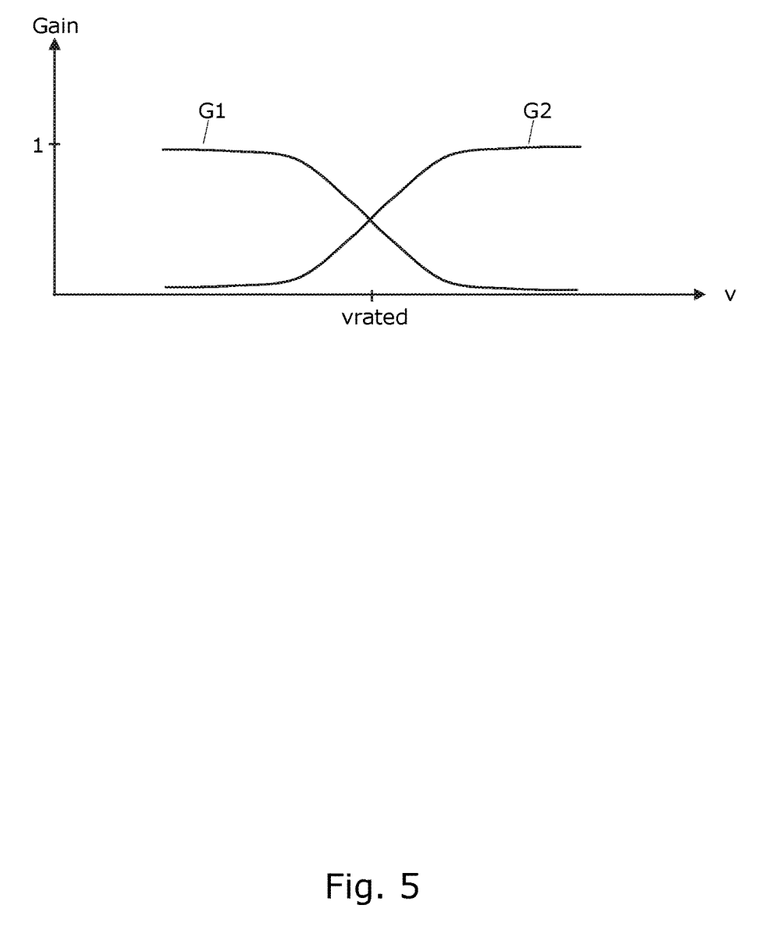
FIG. 5 shows an example of the variable gains for a control system.

FIG. 5 shows an example of the first and second gains G1, G2 as a function of wind speed v. As shown, the first and second gains G1, G2 may be determined so that the sum of the first and second gains are substantially constant, e.g. equal to one, over a range of wind speeds comprising the rated wind speed, and possibly extending from a cut-in wind speed to a cut-out wind speed. For example, the sum of gains may be restricted to a maximum constant value over a range of wind speeds in the vicinity of the rated wind speed, e.g. over a range extending from (vrated-0.1 times vrated) to (vrated+0.1 times vrated). At or near the rated wind velocity the first gain G1 is equal to the second gain G2, e.g. equal to 0.5. Values of the first and second gains G1, G2 as a function of wind speed may be given according to predetermined curves as shown in FIG. 5, i.e. from functions or a look-up tables which provides predetermined gain values (G1, G2) as a function of wind speed. Alternatively, the values of the first and second gains G1, G2 may be determined dependent on other operational parameters of the wind turbine.

For any wind speed neither of the gains G1, G2 become zero since both the partial and full load controller 403, 404 need to be active for ensuring a coupling between the two controllers.

A gain scheduler 410 comprised by the control system 400 may be provided for determination of the variable gains G1, G2 whether they are determined dependent on wind speed or other operational parameters (described below).

For example, the gain scheduler 410 may be configured to determine the variable first and second gains G1, G2 so that the first gain G1 is greater than the second gain G2 for wind speeds above below the rated wind speed, so that the first gain G1 is smaller than the second gain G2 for wind speeds above rated wind speed, and so that the first gain G1 is equal to the second gain G2 at the rated wind speed. Additionally, the gain scheduler 410 may be configured to determine the gains G1, G2 so that the sum of the first and second gains constant, or substantially constant, over a range of wind speeds comprising the rated wind speed.

The illustrated gain curves for G1 and G2 may have other shapes than illustrated in FIG. 5. Thus, the slopes of the curves closest to vrated may be more or less steep. The slopes of the curves further distanced from vrated may also have other slopes, including generally flat (zero slope) portions. The curves may be smooth curves as shown, but could also be made from piecewise linear curve elements. In general the curves should be continuous.

Due to the gradual changes of the first and second gains G1, G2 as a function of wind speed v there is no need for switching between the partial and full load controllers. That is, for wind speeds well below the rated wind speed, the partial load controller 403 has a dominating control action since the gain of the full load controller is low. For wind speeds well above the rated wind speed, the full load controller 404 has a dominating control action since the gain of the partial load controller is low. When the wind speed approaches and passes the rated wind speed the control action of the previously dominating controller (e.g. the partial load controller) is reduced and the control action of the other controller (in this case, the full load controller) is gradually increased.

A purpose of the first speed modification ΔPLC is to ensure that the generator request Preq is driven towards the maximum generator reference Pmax for wind speed increasing above the rated wind speed. Pmax may be set to a fixed Prated or Pderated. In this way, the power generator 207 is controlled to limit the power production to Pmax during full load.

A purpose of the second speed modification ΔFLC is to ensure that the pitch request θreq is driven towards the minimum pitch θmin, e.g. the optimum pitch θopt, for wind speed decreasing below the rated wind speed. In this way, the pitch system is controlled to be as extract as much wind power as possible during partial load.

A purpose of the first and second gains G1, G2 is to ensure a weighted distribution of the control actions of the partial and full load controllers 403, 404 for wind speeds around the rated wind speed, i.e. for wind speeds in a range above and below the rated wind speed.

Figure 6:
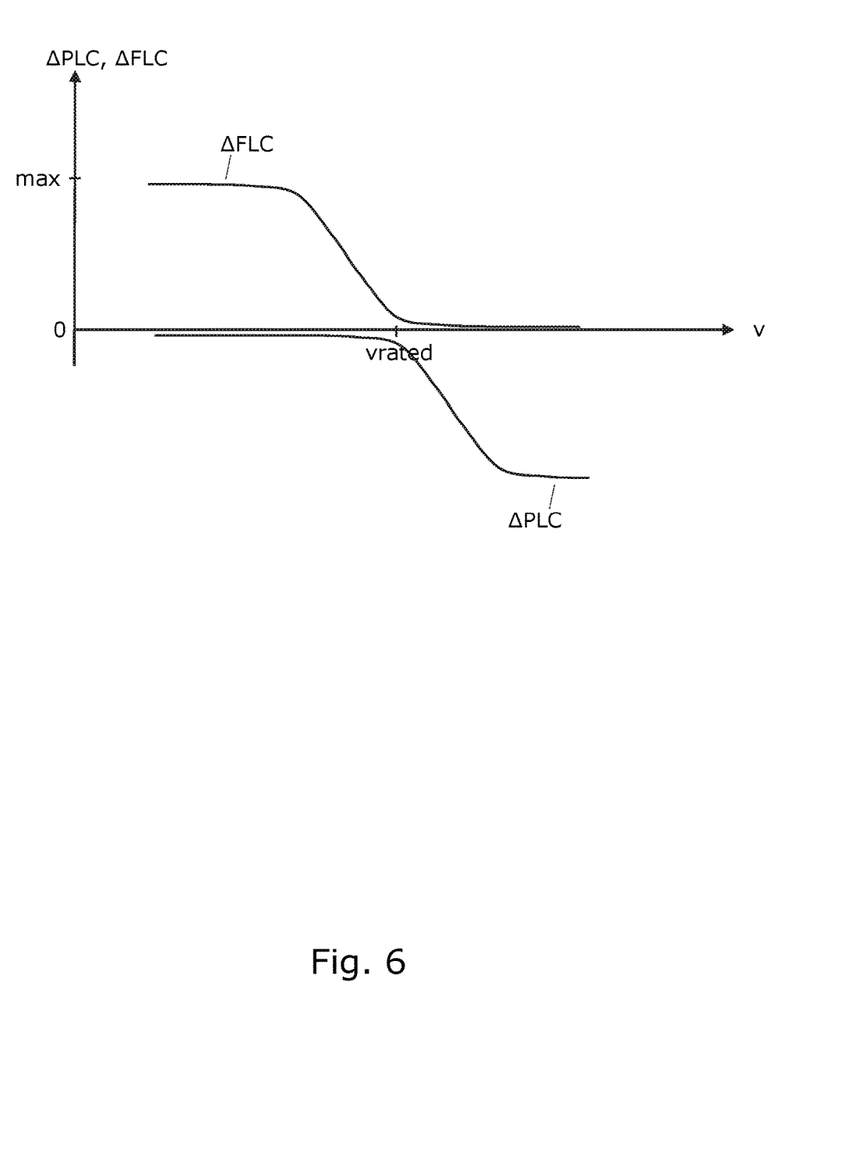
FIG. 6 shows an example of predetermined first and second speed modifications functions.

Values of the first and second speed modifications ΔPLC, ΔFLC may be given according to predetermined functions or look-up table providing values for the speed modifications ΔPLC, ΔFLC as a function of wind speed. FIG. 6 shows an example of predetermined first and second speed modifications functions ΔPLC, ΔFLC. The illustrated gain curves for ΔPLC and ΔFLC may have other shapes than illustrated in FIG. 6. Thus, the slopes of the curves closest to vrated may be more or less steep. The slopes of the curves further distanced from vrated may also have other slopes, including generally flat (zero slope) portions. The curves may be smooth curves as shown, but could also be made from piecewise linear curve elements. In general the curves should be continuous.

Alternatively, as shown in FIG. 4 the first and second speed modification values ΔPLC, ΔFLC may be determined dependent on operational parameters of the wind turbine.

For that purpose the control system 400 comprises first and second speed modification calculation units 405, 406.

The first speed modification calculation unit 405 is configured for determining the first speed modification ΔPLC dependent on a difference between an actual pitch θm, e.g. the requested pitch θreq, and the pitch reference θref. Accordingly, in partial load where the requested pitch θreq may be equal to the pitch reference θref, the first speed modification ΔPLC may be equal or close to zero. In full load where the requested pitch is larger than the optimum pitch in order to reduce the aero dynamic efficiency, values of the first speed modification ΔPLC becomes negative.

The second speed modification calculation unit 406 is configured for determining the second speed modification ΔFLC dependent on a difference between an actual power, e.g. the requested power Preq, and the power reference Pref, e.g. the rated or de-rated power reference Prated, Pderated. Accordingly, in partial load where the requested power Preq is smaller than the rated or de-rated power reference, values of the second speed modification ΔFLC becomes positive. In full load where the requested power Preq may be equal to Prated or Pderated, the second speed modification ΔFLC may be equal or close to zero.

According to these example, the gains Kpl and Kfl has a constant positive values. However, they could also have constant negative values.

It is understood that the first and second speed modification calculation units 405, 406 may also embody functions for determining values of the first and second speed modifications ΔPLC, ΔFLC from predetermined functions or look-up tables as a function of wind speed.

The gain scheduler may be configured to determine the first gain G1 or the second gain G2 dependent on a difference between the actual pitch θm, e.g. the requested pitch θreq, and the pitch reference θref.

Alternatively or additionally, the first gain G1 or the second gain G2 may be determined dependent on a difference between the actual power Pm, e.g. the requested power Preq, and the power reference Pref, e.g. Prated.

Figure 7:
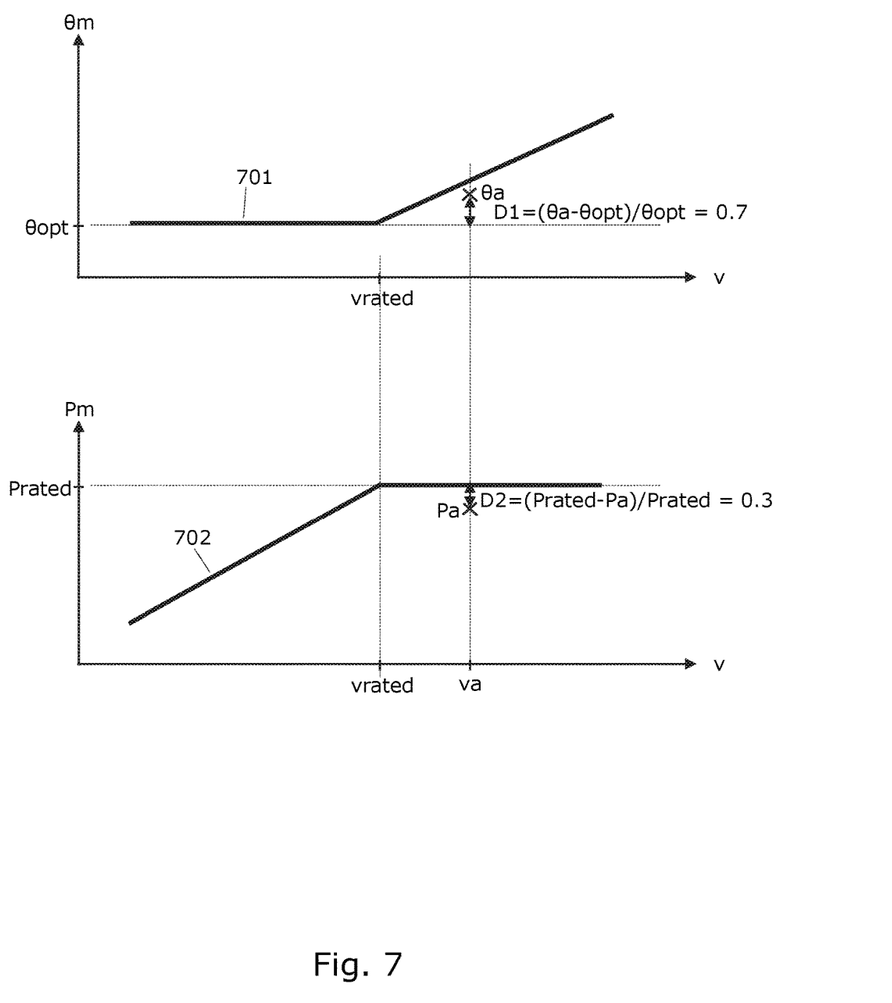
FIG. 7 illustrates principally how the variable gains could be determined dependent on the pitch and power differences.

FIG. 7 illustrates principally how the gains G1, G2 could be determined dependent on the pitch and power differences as described above. Curves 701 and 702 illustrate typical values for actual pitch θm and power Pm values, respectively, dependent on wind speed v. Pitch θa and power Pa have been measured at a wind speed va. The normalised distance D1 between θa and the optimum pitch for that wind speed is determined as D1=(θa−θopt)/θopt=0.7. The normalised distance D2 between Pa and the rated power is determined as D2=(Prated-Pa)/Prated=0.3.

In this example, based on D1, D2 or both distances it may be assumed that the wind turbine should be operated in a full mode state since the D1 is relatively large, D2 is relatively small, or since D1 is larger than D2. The gains G1 and G2 may be determined based on the assumption of full mode operation and based on the distances D1 and D2 by assigning predetermined values to the gains G1 and G2. Since D1 is large a relatively small value may be assigned to G1 and since D2 is small (compared to D1) a relatively large value may be assigned to G2. The gain values G1, G2 may be given by predetermined gain values dependent on the distances D1, D2 and provided via a look-up table or similar.

According to an embodiment equations 1-5 below provides a method for determining the gains G1 and G2 based on ΔPLC and ΔFLC, i.e. based on pitch values θreq and θref, and power values Preq and Pref.

Equations 1-5:

$$R(k) = \frac{\Delta PLC(k-1)}{\Delta PLC(k-1) + \Delta FLC(k-1)}$$

$$G1(k) = Glow; R(k) \leq Glow$$

$$G1(k) = R(k); Glow \leq R(k) \leq Gup$$

$$G1(k) = Gup; R(k) \geq Gup$$

$$G2(k) = 1 - G1(k)$$

In equations 1-5, k is the sampling number and Glow and Gup are lower and upper limit values for the gains. Accordingly, G1 is equal to Glow when R(k) is lower than or equal to Glow, equal to R(k) when R(k) is greater than Glow and smaller than Gup and equal to Gup when R(k) is greater than or equal to Gup. G2 is given by 1−G1.

According to another embodiment an alternative method for determining R(k) based on ΔPLC and ΔFLC for use in equations 1-5 can be provided by equations 6-8:

$$RPLC(k) = 1 - \frac{\Delta PLC(k-1) - \Omega low PLC}{\Omega up PLC - \Omega low PLC}$$

$$RFLC(k) = 1 - \frac{\Delta FLC(k-1) - \Omega low FLC}{\Omega up FLC - \Omega low FLC}$$

$$R(k) = \frac{RFLC(k)}{RPLC(k) + RPLC(k)}$$

In equations 6-8 ΩlowPLC and ΩupPLC are lower and upper limits for ΔPLC and ΩlowFLC and ΩupFLC are lower and upper limits for ΔFLC. RPLC(k)+RFLC(k) is equal to one for all values of k.

An example is described applying to equations 6-8 wherein the wind conditions should cause operation of a wind turbine in partial load. In this case ΔPLC should be equal to ΩlowPLC as the wind pitch request θreq should be equal to θopt. Since the distance from rated power is big ΔFLC should be saturated to its upper limit ΩupFLC which causes an artificial power error e2ω. Thereby the full load controller 404 sees the generator speed ωm as low compared to the reference ω_refFLC and reacts by increasing the pitch. However, as the limit θmax cannot be exceeded, θreq will converge to θmax. In this example, control authority should be given to the partial load controller 403, while the gain of the full load controller 404 should be reduced to increase stability margins. In this example, G1 should have the value Gup, e.g. 0.9. From eq. 5 if follows that G2 will equal 0.1.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage. Any reference signs in the claims should not be construed as limiting the scope.

The invention claimed is:

1. A method for controlling a wind turbine, wherein the wind turbine comprises a rotor with at least one blade having a pitch angle which is controllable dependent on a pitch request, and a power generator connected to the rotor, the power generator having a power production which is controllable dependent on a generator request, wherein a generator speed of the generator is controllable via the pitch request and the generator request, the method comprising:
controlling the generator speed by determining the generator request dependent on a first generator speed error determined dependent on a generator speed reference, the generator speed, and a first speed modification, wherein the generator request is determined by minimizing the first generator speed error, wherein the first speed modification is determined so that the generator speed approaches the generator speed reference for wind speeds below a rated wind speed, wherein the first speed modification is determined so that the generator request approaches a maximum generator request for wind speeds above the rated wind speed, wherein the maximum generator request is a partial load controller saturation limit, and wherein the first generator speed error is amplified by a variable first gain,
controlling the generator speed by determining the pitch request dependent on a second generator speed error determined dependent on the generator speed reference, the generator speed, and a second speed modification, wherein the pitch request is determined by minimizing the second generator speed error, wherein the second speed modification is determined so that the generator speed approaches the generator speed reference for wind speeds above the rated wind speed, wherein the second speed modification is determined so that the pitch request approaches a minimum pitch request for wind speeds below the rated wind speed, wherein the minimum pitch request is a full load controller saturation limit, and wherein the second generator speed error is amplified by a variable second gain, and determining the variable first and second gains so that the first gain is greater than the second gain at least for some for wind speeds below the rated wind speed, so that the first gain is smaller than the second gain at least for some wind speeds above rated wind speed, and so that the first gain is equal to the second gain at least for a single wind speed in proximity of the rated wind speed.

2. The method according to claim 1, comprising controlling the generator speed by determining the generator request, the pitch request, and the first and second gains for wind speeds below, above, and at the rated wind speed.

3. The method according to claim 1, wherein the first and second gains are determined so that a sum of the first and second gains are substantially constant over a range of wind speeds comprising the rated wind speed.

4. The method according claim 1, wherein the first gain or the second gain is determined dependent on a difference between an actual pitch and a pitch reference.

5. The method according to claim 1, wherein the first gain or the second gain are determined dependent on a difference between an actual power and a power reference.

6. The method according to claim 1, wherein the first speed modification is determined dependent on a difference between an actual pitch and a pitch reference.

7. The method according to claim 1, wherein the second speed modification is determined dependent on a difference between an actual power and a power reference.

8. The method according to claim 1, wherein the first generator speed error is determined dependent on a first modified generator speed reference and the generator speed, wherein the first modified generator speed reference is determined by addition of the first speed modification to the generator speed reference.

9. The method according to claim 1, wherein the second generator speed error is determined dependent on a second modified generator speed reference and the generator speed, wherein the second modified generator speed reference is determined by addition of the second speed modification to the generator speed reference.

10. A control system for controlling a wind turbine, wherein the wind turbine comprises a rotor with at least one blade having a pitch which is controllable dependent on a pitch request, and a power generator connected to the rotor, the power generator having a power production which is controllable dependent on a generator request, wherein a generator speed of the rotor is controllable via the pitch request and the generator request, the control system comprising:
 a partial load speed error calculation unit configured for determining a first generator speed error dependent on a generator speed reference, the generator speed, and a first speed modification,
 a full load speed error calculation unit configured for determining a second generator speed error dependent on the generator speed reference, the generator speed, and a second speed modification,
 a first speed modification calculation unit configured for determining the first speed modification so that the generator speed approaches the generator speed reference for wind speeds below a rated wind speed, and so that the generator request approaches a maximum generator request for wind speeds above the rated wind speed, wherein the maximum generator request is a partial load controller saturation limit,
 a second speed modification calculation unit configured for determining the second speed modification so that the generator speed approaches the generator speed reference for wind speeds above the rated wind speed, and so that the pitch request approaches a minimum pitch request for wind speeds below the rated wind speed, wherein the minimum pitch request is a full load controller saturation limit,
 a partial load controller configured for controlling the generator speed by determining the generator request dependent on the first generator speed error by minimizing the first generator speed error, wherein the partial load controller is configured for amplifying the first generator speed error by a variable first gain,
 a full load controller configured for controlling the generator speed by determining the pitch request dependent on the second generator speed error by minimizing the second generator speed error, wherein the full load controller is configured for amplifying the second generator speed error by a variable second gain, and
 a gain scheduler configured for determining the variable first and second gains so that the first gain is greater than the second gain at least for some for wind speeds below the rated wind speed, so that the first gain is smaller than the second gain at least for some wind speeds above rated wind speed, and so that the first gain is equal to the second gain at least for a single wind speed in proximity of the rated wind speed.

11. A wind turbine comprising:
 a tower;
 a power generator disposed on the tower, the power generator having a controllable power production dependent on a generator request;
 a rotor connected to the power generator and comprising at least one blade having a controllable pitch dependent on a pitch request, wherein a generator speed of the rotor is controllable via the pitch request and the generator request; and
 a control system for controlling the wind turbine, wherein the control system comprises:
  a partial load speed error calculation unit configured for determining a first generator speed error dependent on a generator speed reference, the generator speed, and a first speed modification,
  a full load speed error calculation unit configured for determining a second generator speed error dependent on the generator speed reference, the generator speed, and a second speed modification,
  a first speed modification calculation unit configured for determining the first speed modification so that the generator speed approaches the generator speed reference for wind speeds below a rated wind speed, and so that the generator request approaches a maximum generator request for wind speeds above the rated wind speed, wherein the maximum generator request is a partial load controller saturation limit,
  a second speed modification calculation unit configured for determining the second speed modification so that the generator speed approaches the generator speed reference for wind speeds above the rated wind speed, and so that the pitch request approaches a minimum pitch request for wind speeds below the rated wind speed, wherein the minimum pitch request is a full load controller saturation limit, a partial load controller configured for controlling the generator speed by determining the generator request dependent on the first generator speed error by minimizing the first generator speed error, wherein the partial load controller is configured for amplifying the first generator speed error by a variable first gain, a full load controller configured for controlling the generator speed by determining the pitch request dependent on the second generator speed error by minimizing the second generator speed error, wherein the full load controller is configured for amplifying the second generator speed error by a variable second gain, and a gain scheduler configured for determining the variable first and second gains so that the first gain is greater than the second gain at least for some for wind speeds below the rated wind speed, so that the first gain is smaller than the second pain at least for some wind speeds above rated wind speed, and so that the first gain is equal to the second gain at least for a single wind speed in proximity of the rated wind speed.

* * * * *